United States Patent Office 3,645,943
Patented Feb. 29, 1972

3,645,943
FREE ISOCYANATE-BLOCKED WRINKLE FINISH COATING COMPOSITIONS AND ARTICLES COATED THEREWITH
Arthur J. Krawczyk, Cheektowaga, N.Y., assignor to Textron Inc.
No Drawing. Filed June 19, 1970, Ser. No. 47,894
Int. Cl. C09d 3/72, 5/28
U.S. Cl. 260—22 TN        33 Claims

ABSTRACT OF THE DISCLOSURE

There is disclosed a normally-liquid, free isocyanate-blocked coating composition which forms a wrinkle-finish coating upon curing, comprising (I) the reaction product of (A) a diisocyanate-aliphatic polyol urethane prepolymer and (B) an isocyanate-reactive oxime, said reaction product containing an essentially stoichiometric equivalent of (B) per equivalent of free isocyanate in (A); and (II) a minor amount sufficient to cause a wrinkle-finish upon curing, e.g., at least about 0.1 weight percent based on the total solids content of urethane prepolymer and oxime in the composition, of zinc in the form of a zinc salt of an $\alpha$-alkyl branched fatty acid, said zinc salt having been incorporated in the composition after the formation of the reaction product (I). Advantageously, a polyhydroxyl-containing crosslinking agent is also present in the liquid coating compositions and is also incorporated after the formation of the reaction product (I). A process of curing such compositions to effect a wrinkle-finish coating and articles coated therewith are also disclosed.

This invention relates to wrinkle-finish coatings formed by baking blocked polyurethane prepolymers in the presence of zinc salts of $\alpha$-alkyl branched fatty acids. More particularly, the invention concerns wrinkle-finish coatings formed by baking oxime-blocked, polyurethane prepolymers containing a minor amount sufficient to cause wrinkle-finish on curing, of zinc in the $\alpha$-alkyl fatty acid salt form using baking conditions conductive to fast cure.

Wrinkle-finish coatings prepared from various alkyd, urea and nitrocellulose resins are known. Such wrinkle finishes have proven desirable primarily from an aesthetic viewpoint as coatings for metal cabinets such as those containing scientific instruments, radio equipment, metal furniture and office equipment such as typewriters and calculating machines. Furthermore, some studies and papers concerned with the theoretical considerations of wrinkle-finish, resinous coatings are known. One such study is reported in a paper by Burrell, Industrial and Engineering Chemistry, vol. 46, No. 10, pp. 2233 to 2237 (1954).

According to the present invention wrinkle-finish coatings formed by reacting blocked polyurethane prepolymers in the presence of zinc salts of $\alpha$-alkyl branched fatty acids in general exhibit improved hardness and durability as well as increased abrasion and chemical resistance. Consequently, the wrinkle-finish coatings of this invention are more advantageous than those of the prior art, particularly from a consideration of durability and wear.

The polyurethane prepolymers useful in the coating compositions of this invention are reaction products of (A) essentially hydrocarbon diisocyanate and (B) aliphatic polyol. Since the prepolymers are prepared using an excess of the diisocyanate reactant, they can be characterized as being isocyanate-terminated. Suitable organic diisocyanates useful in making the prepolymers employed in this invention include aliphatic, cycloaliphatic and aromatic diisocyanates. Specifically illustrative of suitable diisocyanates are, for example, tolylene diisocyanates, diphenylmethane-4,4'-diisocyanate, para-phenylene diisocyanate, dicyclohexylmethane-4,4'-diisocyanate, 1-isocyanato-3-isocyanatomethyl-3,5,5-trimethylcyclohexane, hexamethylene diisocyanate, bis(2-isocyanoethyl) fumarate, 1,5 naphthalene diisocyanate and the like.

The isocyanates may be substituted with non-interfering groups, such as aliphatic hydrocarbon radicals, e.g., lower alkyl groups. The hydrocarbon portion of the diisocyanate often has at least about 6 carbon atoms and usually does not have more than about 24 carbon atoms. Diisocyanates of 6 to about 15 carbon atoms in the hydrocarbon group are preferred. A minor molar amount of the total isocyanate reactant may have other than two isocyanate groups per molecule if desired.

The amount of organic isocyanate component employed is usually such as to give an excess of isocyanate groups to hydroxyl radicals in the polyol; for instance, often a ratio of about 1.2 to 2.5:1, preferably about 1.6 to 2:1 isocyanate to hydroxyl groups is used. In any event, the prepolymer contains an excess of isocyanate groups sufficient to provide a reactive prepolymer. The free isocyanate groups in the prepolymer, aside from any unreacted diisocyanate present, are generally at least about 1 or 1.5 weight percent of the prepolymer, and may be as much as about 30% or more on the basis of total urethane content. When relatively high molecular weight polyols, e.g. having molecular weights in excess of about 200 or 300, are employed in making the prepolymer, it is often desired that the final product be moisture-curable. A free isocyanate content in the moisture-curable prepolymer up to about 15 weight percent of the total composition, say about 5 to 10%, is often preferred. Exemplary of such prepolymers are those prepared with polyoxyalkylene glycols or polyesters of fairly high molecular weight and, therefore, relatively low hydroxyl functionality in relation to molecular weight.

On the other hand, where lower molecular weight polyols of relatively high hydroxy functionality as, for a given molecular weight, e.g., trimethylolpropane or other polyols of up to about 200 or 300 molecular weight, are used in preparing the prepolymers, it is usually desired that, rather than moisture-cured, these prepolymers be polyol-cured, i.e., that they be cured with the aid of polyhydroxyl-containing agents such as the polyols useful in the prepolymer preparation mentioned hereinafter, particularly the higher molecular weight polyols discussed above such as the polyether glycols and various polyesters. In the polyol cured systems it is usually preferred that the prepolymer have a free isocyanate content prior to blocking in the range of about 5 to 15 weight percent of the total prepolymer composition.

As indicated in the foregoing discussion, the essentially aliphatic polyol employed in making the urethane prepolymer may be selected from a wide variety of polyhydroxyl-containing materials, including hydroxyl-containing polyethers and polyesters as well as simple polyols. The aliphatic polyols have two or more hydroxyl groups attached to aliphatic or cycloaliphatic carbon atoms. Aliphatic, (including cyclophatic) polyhydroxyl-containing essentially hydrocarbon compounds are the major molar amount of the polyol component of the prepolymer although minor molar amounts of aromatic polyols, i.e. phenols, may be employed, if desired. The polyol may contain as few as 2 carbon atoms or may have a molecular weight as high as about 3000 or 5000 or more.

Among the suitable simple polyols and polyhydroxyl-containing polyethers are those represented by the general formula:

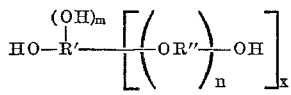

wherein R′ is a hydrocarbon radical, preferably aliphatic such as alkylene of 2 to about 12, preferably 2 to about 6, carbon atoms, and R″ is an alkylene radical of 2 to 4, preferably 2 to 3, carbon atoms. The letter $n$ is a number from 0 to about 50, preferably aobut 2 to 30 for more flexible coatings; the letter $x$ is 0 to about 4 and the letter $m$ is 0 to 2 or more. When $n$ has a value of 2 or more (providing a polyether), R′ may be the same as R″ and $m$ may be zero. However, the polyethers may be made from an alkylene oxide and an alcohol having more than two hydroxyl groups in which case R and R′ may well be different, $m$ will be zero and there may be two or more

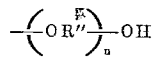

groups attached to R′, i.e. $x$ is greater than one. Nondeleterious substituents, preferably having no active hydrogen atoms, may likewise be present in the polyol.

As suitable simple polyols may be mentioned ethylene glycol, propylene glycol, trimethylol propane, 1,4-butane diol, trimethylol ethane, 1,6-hexamethylene glycol, 1,2,6-hexanetriol, etc. As suitable polyether polyols may be mentioned the polyoxyalkylene glycols such as polyoxyethylene glycols (preferably of up to about 2000 molecular weight), polyoxypropylene glycols (preferably of up to about 3000 molecular weight), polyoxybutylene glycols, adducts of 1,2,6-hexanetriol and propylene oxide, etc. Polyether polyols, as above-mentioned, are ideally suited as the polyol reactant for the preparation of moisture-curable urethane prepolymers.

Other useful polyols for preparing the urethane prepolymer used in this invention include polyhydroxyl-containing esters and polyesters, such as castor oil, polyol-modified triglyceride oils, and the like. Polyhydroxyl-terminated polyesters are generally made by reaction of an excess of an aliphatic polyhydroxy alcohol, such as the simple polyols mentioned above, with one or more aliphatic (including cycloaliphatic) or aromatic polycarboxylic acids or anhydrides. Frequently, in the polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, or dimers of olefinically-unsaturated monocarboxylic acids, such as linoleic acid dimer, etc. These polyesters often have molecular weights in the range of about 500 to 2000 or 3000 or more.

The urethane prepolymers of the present invention can be made by reaction of the diisocyanate and the polyol at temperatures often in the range of about 30 to 130° C., with about 40 to 100° C. being preferred. The reaction is preferably continued until there is essentially none, if any, unreacted hydroxyl functionality remaining. Known polymerization techniques, such as stepwise mixing of the diisocyanate with the polyol to enhance temperature control, may be utilized.

The prepolymer is commonly prepared in the presence of an essentially inert solvent and the prepolymer is normally liquid, at least when dissolved in the solvent. The solvent serves to insure that the reactants are in the liquid state, and the solvent permits better temperature control during the reaction by serving as a heat sink and, if desired, as a refluxing medium. Various solvents, including mixtures of such materials, may be employed; among the useful solvents are aromatic hydrocarbons, esters, ethers, ester-ethers, chlorinated hydrocarbons, etc. Frequently, the solvents are volatile materials which will evaporate from the coating composition while it cures; consequently there may be no need to remove any portion of the solvent from the reaction product prior to its application as a coating. The amount of solvent employed may vary widely, but too large a volume may be uneconomical or give materials with undesirably or inconveniently low viscosity. Thus, the amount of solvent may be selected in order to provide a reaction product of film application viscosity, but products of greater viscosity can be cut-back before use. Often about 0.25 to 6 weights of solvent, preferably about 0.5 to 2 weights of solvent, per weight of the total urethane content, are used. Among the suitable normally liquid solvents are xylene, butyl acetate, methyl ethyl ketone, ethylene glycol ethyl ether acetate (Cellosolve acetate), 1,1,1-trichloro-ethane, dimethylformamide, dimethylsulfoxide, dioxane, etc., and their mixtures; it is preferred that the solvent contain not more than about 10 carbon atoms per molecule.

Blocking of the free-isocyanate containing prepolymer is effected by reaction of an essentially stoichiometric equivalent of an oxime, preferably a ketoxime but also including aldoximes, per equivalent of free isocyanate in the prepolymer, prior to crosslinking. Suitable oximes include those represented by the formula

wherein R is an essentially hydrocarbyl group of up to about 20 carbon atoms and R′ is hydrogen or R. The oximes encompassed by the above formula exist in both the syn and anti forms. Preferably both of the R groups above are hydrocarbyl (i.e. ketoximes) and are advantageously alkyl, cycloalkyl and aralkyl groups of less than about 10 carbon atoms, e.g. lower alkyl. Exemplary are methyl, ethyl, isobutyl, octyl, cyclohexyl, benzyl and phenethyl. Particularly advantageous specific oximes are methyl ethyl ketoxime, dimethyl ketoxime, methyl hexyl ketoxime, methyl benzyl ketoxime, and the like.

The blocking of the urethane prepolymer can be effected by simply adding the above blocking agent to a solution of the diisocyanate-polyol reaction product. Temperatures for the blocking reaction may be about 25 to 145, preferably about 45 to 130° C., and the reaction may proceed for a time sufficient to provide blocking of essentially all of the free isocyanate groups of the prepolymer.

The blocked prepolymer-containing composition of the present invention is in an essentially liquid state for application as a coating on a substrate. The blocked prepolymer may itself be liquid or be placed in such state by dissolution in a suitable solvent. Heating of the compositions causes the prepolymer to unblock and make the free isocyanate groups available for crosslinking. Normally the heating is effected by baking the applied coatings.

If desired, there may also be added to the blocked urethane prepolymer compositions of the present invention crosslinking amounts of a polyhydroxyl-containing crosslinking agent. As discussed earlier, such crosslinking agents are frequently employed in the curing of what I have termed as "polyol-curable" urethanes. Often preferred cross-linking agents are the polyhydroxyl-containing polyesters made from polycarboxylic acids and polyols as described above. The addition to the coating composition of castor oil or of a castor oil-pentaerythritol reaction product can, for instance, serve to enhance the flexibility and toughness of the final cured film. Also, addition of other polyols such as glycols or polyether glycols is useful to crosslink the unblocked polyurethane prepolymer.

The zinc salts of α-alkyl branched fatty acids are an essential ingredient for the formation of the wrinkle-finish coatings of this invention. The α-branched carboxylic acids include those represented by the formula

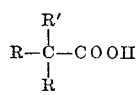

wherein the R groups are essentially alkyl of up to about 20 carbon atoms and the R' group is hydrogen or R. Preferably the acid has a total of up to about 20 carbon atoms. The preferred group of α-branched carboxylic acids are those having a quaternary carbon atom (i.e. those acids characterized by the presence of the neo-structure). Those acids wherein each R and R' group are lower alkyl are particularly advantageous. Exemplary of specific useful carboxylic acids are the various isomers of neodecanoic acid, neopentanoic acid, neohexanoic acid, neoheptanoic, isomers of neooctanoic acid, 2-ethyl hexanoic acid, neotridecanoic acid, 2-methyl decanoic acid and 2-pentyl decanoic acid.

The zinc salts can be added to the blocked polyurethane prepolymer separately or along with any polyol-crosslinking agent. Therefore, according to the general scheme of this invention the polyurethane prepolymer is first blocked and then the zinc salt and, if present, polyol crosslinker are added together or separately. The resultant mixture is normally liquid or made so by the presence of solvent in the composition. The substrate to be coated is then coated by conventional methods such as casting, dipping, etc.

According to this invention the extent of wrinkle-finish of the polyurethane coating appears to increase with faster cure in the presence of the zinc salts. Therefore, such factors as high curing temperature, high rate of heating, the use of fast solvents (i.e. volatile) and air drying before baking may aid in the formation of the wrinkled finish coatings of this invention. However, the essential feature of the present invention is the presence of a minor amount of the defined zinc salt sufficient to effect the wrinkled-finish. Often at least about 0.1% by weight of zinc present as the salt, based upon the total solids content of the oxime-blocked polyurethane prepolymer is required to effect a wrinkle-finish. Substantially higher weight percents of zinc may be present in the composition; for example, amounts of up to about 2 or even about 5% more by weight are useful. Such amounts, however, may deleteriously affect the other properties of the final coatings. Therefore, normally from about 0.2 to 1, preferably from 0.3 to 0.8, weight percent of zinc, present as the salt and based on the total solids content of the oxime-blocked polyurethane prepolymer, is present in the composition.

Curing of coating is normally effected as previously mentioned by heating the blocked polyurethane prepolymer with a curing agent such as water or polyol to unblock the free isocyanate groups and react the unblocked isocyanate groups with curing agent. The presence of a separately added curing agent is not, however, an essential element since moisture from the environment by itself may effect curing of some or all of the polyurethane prepolymers herein. The temperature required to unblock the isocyanate groups of the prepolymer depends on a number of factors such as the particular oxime blocking agent; the isocyanate and polyol reactants used in the prepolymer; the solvent, if present; and the like. Normally, however, heating to above about 100° C. is sufficient to effect substantial unblocking. In practice, however, unblocking is normally effected at or while approaching the temperature of the baking operation.

The baking temperature has an effect upon the degree of wrinkle present on the coating since a fast cure is advantageous for the production of wrinkling. Therefore, baking temperatures above about 100° C., preferably above about 125° C., and most advantageously above about 140° C., are useful. The temperature is not so high as to unduly adversely affect the coating and usually there is no need to go above 200° C. for baking. Also, the thickness of the coating is a factor in the preparation of a wrinkled coating. Generally, the thicker the coating is, the better the wrinkle pattern that is provided on the final coating. However, the essential feature of this invention is that the final coating has a wrinkle finish. Great variations in a number of curing reaction parameters, as mentioned previously, therefore, are possible while accomplishing this essential result.

The coating compositions of this invention are normally applied to solid substrates, particularly metallic substrates, as films, e.g. of less than about 10 mils thickness, and can contain other additives to impart special properties such as plasticizers, pigments, dyes, fillers, metallic driers, etc. Also, the substrate for the coating may be a specially treated material, including, for example, flammable members impregnated with fire-resistant chemicals or coated with a sealant.

The following are non-limitative specific embodiments of this inventoin. Unless indicated otherwise the percentages herein are by weight.

EXAMPLE I

One thousand four hundred thirty four grams of the propylene oxide adduct of 1,2,6-hexanetriol having a molecular weight of about 700, 1350 grams of 1-isocyanato-3-isocyanatomethyl - 3,5,5 - trimethyl cyclohexane, 30 grams of 2,6-di-tert-butyl-4-methyl phenol, 2.76 grams of dibutyl tin dilaurate and 836 grams of toluene are charged to a 5 liter Pyrex flask provided with a stirrer, nitrogen blanket, reflux condenser, thermometer and electric heating mantle; such equipment is commonly used for the preparation of polyurethane coatings. An exothermic reaction occurs upon stirring and the temperature of the reaction mixture reached 90° C. The percent free NCO of the mixture is 6.8 after 2¾ hours. The mixture is allowed to cool to 50° C. when 526 grams of methyl ethyl ketoxime blocking agent are added and stirring and heating continued for 2½ hours while the temperature rises to 78° C. At this point heating is discontinued. After cooling to room temperature the vehicle solids are cut from 77.2 to 50% with ethylene glycol ethyl ether acetate, i.e. Cellosolve acetate, and 0.1 percent by weight based on solids of dibutyl tin diacetic is also added. After the addition and reaction of the methyl ethyl ketoxime, the percent free NCO is zero.

A 3 mil wet film of this vehicle cast on an aluminum panel is cured at 150° C. in 10 minutes giving a smooth film possessing good color, mar resistance and hardness.

The same vehicle containing 0.6 percent zinc added as Zinc Ten Cem, a mixture of zinc salts (16% Zn) of isomers of neodecanoic acid available from Mooney Chemicals, Inc., by weight based on total vehicle solids was cast in a 3 mil wet film on an aluminum panel and cured for 15 minutes at 150° C. The final cured film was wrinkled and had good color, flexibility and mar resistance. Therefore, the addition of the zinc salt of the mixture of neodecanoic acid isomers to this vehicle results in a wrinkled-finish on the coating.

EXAMPLE II

A polyurethane prepolymer is prepared by placing 400 grams of 1 - isocyanato-3-isocyanatomethyl - 3,5,5 - trimethyl cyclohexane, 0.5 gram of dibutyl tin dilaurate, 165 grams of Cellosolve acetate and 165 grams of xylene in a one liter Pyrex flask having a stirrer, electric heating mantle, thermometer, reflux condenser and nitrogen blanket. With this mixture at 45° C., 72.7 grams of trimethylol propane is added thereto over a two-hour period. The mixture is kept at about 50° C. for five hours after which time the addition of 18.5 grams of 1,3-butylene glycol is started. The duration of this addition is about one hour while maintaining the temperature at 52 to 54° C. The product is then cooled to room temperature. The vehicle gives the following data upon analysis:

| | |
|---|---|
| Nonvolatiles, percent by weight | 62.7. |
| Free NCO, percent | 7.59. |
| Viscosity, poise | 10.5. |
| Gardner color | 1 minus. |

Three thousand grams of polyurethane prepolymer prepared by the above procedure, 480 grams of methyl ethyl ketoxime blocking agent, 564 grams of Cellosolve acetate and 564 grams of xylene are placed in a five liter flask arranged in the manner described in Example I for preparing polyurethane coatings. The temperature is raised while stirring under nitrogen to 50° C. partly from heat of reaction and partly by externally applied heat during 45 minutes. Following this heating, the product is kept overnight with the temperature dropping to 20° C. This free isocyanate blocked vehicle has a nonvolatiles content of 53.9%, a percent free NCO of zero, a viscosity of 5 poise and an American Public Health Association (APHA) color of 90.

Ninety eight and four tenths grams of the above blocked vehicle are mixed with 33.6 grams of a commercially available polyester (X5991A manufactured by Midland Industrial Finishes, Waukegan, Ill.). This polyester had a hydroxyl value of 172.6, an acid value of 0.8, a Gardner color of 1 minus and a viscosity of 65 strokes. Infrared analysis of this ester shows it to consist primarily of diethylene glycol adipate units with minor amounts of glycerol and 1,3-butylene glycol esters. A minor amount of ortho-phthalic acid esters also appears to be present. To this mixture 42.0 grams of Cellosolve acetate is added. Fifty eight grams of this mixture is mixed as shown below with various amounts of the Zinc Ten Cem described in Example I.

The following table shows the results obtained when vehicles with the levels of zinc salt shown are cast on aluminum panels in 3 mil wet films and cured for 10 minutes at 150° C. Films having good color, hardness and flexibility are obtained.

| Zn ten cem, grams | 1.1 | 0.55 | 0.18 | .09 |
| --- | --- | --- | --- | --- |
| | 0.6 | 0.3 | 0.1 | .05 |
| Percent on solids as Zn wrinkle pattern | Good | Good | None | None |

The vehicle containing 0.6% Zn is cast at 3 mils wet film on glass and cured for 30 minutes at 150° C. The film produced exhibited a good pattern of wrinkling on this glass substrate.

The vehicle with 0.3% Zn is cast at 6 mils wet film on aluminum and cured at 150° C. for 10 minutes. The film produced showed very good wrinkling.

It is further found that the film containing 0.3 percent zinc cured at 135° C. to give only about 25 percent as much wrinkling as those cured at 150° C. and 175° C., the latter giving the greatest degree of wrinkling of the group. Thus, other curing parameters being equal, higher curing temperature results in better wrinkled finish. For cures at 150° C. for 10 minutes the 1.5 mils wet film showed no wrinkling, the 3 mil, fine wrinkling and the 6 mil, large wrinkling. The coatings having 0.1 and 0.05 percent zinc when cured at 150° C. for ten minutes showed no wrinkle-finish.

EXAMPLE III

Twelve hundred grams of bis (4-isocyanatocyclohexyl) methane, 1044 grams of the propylene oxide adduct of Example I, 22.5 grams of 2.6-di-tert-butyl-4-methyl phenol and 568 grams of Cellosolve acetate are charged to a 5° liter Pyrex flask having suitable attachments for the preparation of polyurethane vehicles. While stirring under gaseous nitrogen at 32° C., 2.25 grams of dibutyl tin dilaurate are added. After 15 minutes the temperature of the reaction mixture has risen to 74° C. from the heat of reaction evolved. After fifteen additional minutes, 400 grams of methyl ethyl ketoxime are added and the temperature of the reaction mixture is raised to 80° C. At this point 576 grams more of Cellosolve acetate are added to thin the mixture. Stirring is continued under nitrogen while allowing the temperature to fall to 50° C. over a period of 100 minutes. The nonvolatiles content of this vehicle is 66.3 percent and its free NCO percent was .04.

Eighty-four grams of this vehicle are mixed with 26.2 grams of polyester X5991A described in Example II, 53.2 grams Cellosolve acetate and 3.06 grams of the Zinc Ten Cem described in Example I. The resulting vehicle is cast at 3 mils wet film on an aluminum panel and cured for 15 minutes at 150° C. The cured film possessed an excellent pattern of wrinkles as well as good flexibility and mar resistance.

EXAMPLE IV

Five hundred sixty eight grams of xylene, 947 grams of Cellosolve acetate and 1217 grams of 2,4-toluene diisocyanate are placed in a Pyrex flask with arrangements suitable for the preparation of polyurethane coating vehicles. This mixture is stirred under gaseous nitrogen and heated to about 40° C. With the temperature at about 40° C., 285 grams of trimethylol propane are added over a period of 1½ to 2 hours with a continuing gaseous nitrogen purge and stirring. As exotherm which occurred during the addition and cooling is used to keep the temperature at about 40° C. After all of the polyol is added the batch is kept at about 35° to 40° C. for five hours. Then 723 grams of 1,3-butylene glycol are added over about one hour, and the batch held for 3 hours at the same temperature. The free NCO percent of this vehicle was 9.5, the Gardner-Holdt viscosity T to V and the nonvolatiles content 60 percent.

Seven hundred grams of the above prepolymer solution, 145 grams of methyl ethyl ketoxime and 100 grams of Cellosolve acetate are placed in a 2 liter Pyrex flask and allowed to exotherm at about 80° C. under dry nitrogen while stirring. The batch is then kept at 70° C. for one hour with stirring; the percent NCFO is zero.

Fifty grams of the above vehicle are mixed with 23.4 grams of polyester X5991A, having the analysis described in Example II, and 34.0 grams of Cellosolve acetate. This vehicle is found to cure in a 3 mil wet film on an aluminum panel in 15 minutes at 150° C. to a smooth film having good color, mar resistance and hardness.

The same vehicle with 0.6% Zn on a metallic basis (added as in the Zinc Ten Cem described in Example I) cures in 15 minutes at 150° C. in a 3 mil wet film on an aluminum panel to an excellent wrinkle pattern. This vehicle had a nonvolatile content of 71.4 percent, percent free NCO of zero, viscosity 129.9 poise and Gardner color 1 minus.

The original unblocked prepolymer containing the same amount of Zinc Ten Cem and cured in a similar manner with X5991A polyester gave a hazy, brittle film entirely different from either of those described above. The significance of the blocking and attendant cure are shown by this procedure.

EXAMPLE V

A pigmented vehicle is prepared from 31.17% by weight of interesterified castor oil, 38.96% pigment grade titanium dioxide, 14.94% Cellosolve acetate and 14.94% xylene by grinding in a standard paint mill to a #7 grind (North Standards). The modified castor oil is prepared by the interesterification of castor oil with pentaerythritol in a manner well known in the coatings industry. The hydroxyl value of the modified product is about 200.

Thirty-two and six-tenths grams of the vehicle whose preparation is described in Example II, 7.9 grams of the pigmented castor mentioned above, 7.0 grams of Cellosolve acetate and 0.9 g. of the Zinc Ten Cem of Example I are mixed together. A 3 mil wet film of this mixture is cast on an aluminum panel, allowed to stand 10 minutes at room temperature and then cured for 15 minutes at 150° C. A film with a small, regulator wrinkle pattern is formed. The percent zinc on vehicle solids was 0.6.

EXAMPLE VI

The polyester of Example II (30.3%) was ground on a standard paint mill to #7 grind (North Standards), with 29.8% rutile titanium dioxide, 0.3% of a friction reducing silicone, 23.8% Cellosolve acetate and 15.8% xylene. The vehicle of Example II, (18.68 grams), 18.00 grams of the pigmented mixture described above and 0.65 grams of the Zinc Ten Cem of Example I were mixed together. When a 3 mil wet film of this mixture was cast on an aluminum panel and cured for 15 minutes at 150° C., a film having wrinkles, good color, flexibility and hardness was obtained. The percent zinc on vehicle solids was 0.6.

EXAMPLE VII

Vehicles at 50 nonvolatiles content in equal parts of Cellosolve acetaate and xylene are prepared from 25 grams of the vehicle described in Example II. Metal salts are added as shown in the following table. Three mil wet films of these vehicles are cast on aluminum panels and cured for 30 minutes at 150° C. Wrinkling behavior is given in the table.

| Metal salt (grams): | Wrinkling |
|---|---|
| 1.5–5% Sodium Ten Cem [1] | None. |
| 0.31–24% Lead Ten Cem [1] | None. |
| 1.5–5% Calcium Ten Cem [1] | None. |
| 1.5 Zirconium decanoate | None. |
| 0.94 Zinc naphthenate | None. |
| 0.94 Zinc 2-ethyl hexoate | Present. |
| 0.45 Zinc Ten Cem of Example I | Present. |

[1] The sodium, lead and calcium salts, respectively, of the same acid used in making the Zinc Ten Cem of Example I.

This example indicates the essential significance of the use of a zinc salt of an α-allyl branched fatty acid to effect the wrinked finishes of this invention.

It is claimed:

1. A normally-liquid, free isocyanate-blocked coating composition which forms a wrinkle-finish upon curing, comprising (I) the reaction product of (A) an isocyanate group terminated diisocyanate-aliphatic polyol polyurethane prepolymer, and (B) an isocyanate-reactive hydrocarbyl ketoxime, said reaction product containing the essentially stoichiometric equivalent of (B) per equivalent of free isocyanate in (A); and (II) a minor amount, sufficient to effect a wrinkle-finish upon curing, of zinc in the form of a zinc salt of an α-alkyl branched fatty acid, said zinc salt having been combined with reaction product (I) after its formation.

2. The composition of claim 1 wherein at least about 0.2 to 1 weight percent of zinc is present, based on the total solids content of the blocked polyurethane prepolymer.

3. The composition of claim 1 further containing as a curing agent an aliphatic polyhydroxy curing agent, said curing agent having been incorporated in the composition after the formation of said reaction product (I).

4. The composition of claim 3 wherein the curing agent is a hydroxy-terminated polyester.

5. The composition of claim 3 wherein the polyol of the polyurethane prepolymer has a molecular weight of up to about 200.

6. The composition of claim 5 wherein the curing agent is a hydroxy-terminated polyester.

7. The composition of claim 5 wherein the polyol of the reaction product (I) is trimethylol propane.

8. The composition of claim 1 wherein the polyol of the reaction product (I) is a polyether glycol of greater than about 300 molecular weight and whose ether groups contain 2 to 4 carbon atoms.

9. The composition of claim 1 wherein the ketoxime has the formula

wherein R and R' have up to 20 carbon atoms.

10. The composition of claim 9 wherein R and R' are both lower alkyl.

11. The composition of claim 1 wherein the α-alkyl branched fatty acid has an α-neo carbon atom.

12. The composition of claim 11 wherein the α-alkyl branched fatty acid is neodecanoic acid.

13. The composition of claim 11 wherein at least about 0.2 to 1 weight percent of zinc is present, based on the total solids content of the blocked polyurethane prepolymer; further containing as a curing agent an aliphatic polyhydroxy-containing curing agent, said curing agent having been incorporated in the composition after formation of said reaction product (I); and the polyol of the urethane prepolymer has a molecular weight of up to about 200.

14. The composition of claim 11 wherein the polyol of the reaction product (I) is a polyether glycol of greater than about 300 molecular weight and whose ether groups contain 2 to 4 carbon atoms.

15. An article comprising a baked, wrinkle-finish cured coating of the composition of claim 1 on a solid substrate.

16. The article of claim 15 in which the substrate is metallic.

17. An article comprising a baked, wrinkle-finish cured coating of the composition of claim 2 on a solid substrate.

18. The article of claim 17 in which the substrate is metallic.

19. An article comprising a baked, wrinkle-finish cured coating of the composition of claim 3 on a solid substrate.

20. An article comprising a baked, wrinkle-finish cured coating of the composition of claim 4 on a solid substrate.

21. The article of claim 20 in which the substrate is metallic.

22. An article comprising a baked, wrinkle-finish cured coating of the composition of claim 5 on a solid substrate.

23. An article comprising a baked, wrinkle-finish cured coating of the composition of claim 6 on a solid substrate.

24. An article comprising a baked, wrinkle-finish cured coating of the composition of claim 7 on a solid substrate.

25. An article comprising a baked, wrinkle-finish cured coating of the composition of claim 8 on a solid substrate.

26. An article comprising a baked, wrinkle-finish cured coating of the composition of claim 9 on a solid substrate.

27. An article comprising a baked, wrinkle-finish cured coating of the composition of claim 10 on a solid substrate.

28. The article of claim 27 in which the substrate is metallic.

29. An article comprising a baked, wrinkle-finish cured coating of the composition of claim 11 on a solid substrate.

30. An article comprising a baked, wrinkle-finish cured coating of the composition of claim 12 on a solid substrate.

31. The article of claim 30 in which the substrate is metallic.

32. An article comprising a baked, wrinkle-finish cured coating of the composition of claim 13 on a solid substrate.

33. An article comprising a baked, wrinkle-finish cured coating of the composition of claim 14 on a solid substrate.

References Cited

UNITED STATES PATENTS

| | | | |
|---|---|---|---|
| 3,154,427 | 10/1964 | Forrest et al. | 117—41 |
| 3,224,988 | 12/1965 | Skreckoski | 260—22 |
| 3,346,523 | 10/1967 | Wiese | 260—19 |
| 3,395,108 | 7/1968 | Cobbledick et al. | 260—18 |
| 3,583,943 | 6/1971 | Weber et al. | 260—75 |

DONALD E. CZAJA, Primary Examiner

R. W. GRIFFIN, Assistant Examiner

U.S. Cl. X.R.

17—41, 132 R, 161 KP, DIG. 7; 260—18 TN, 18 WF, 33.2 R, 33.6 UB, 40 TN